US012722453B2

(12) United States Patent
Rebinger et al.

(10) Patent No.: US 12,722,453 B2
(45) Date of Patent: Sep. 1, 2026

(54) TEMPERATURE-CONTROL CONTAINER AND TEMPERATURE-CONTROL COOLANT CIRCUIT FOR AN ELECTRICALLY DRIVEN MOTOR VEHICLE, AND MOTOR VEHICLE COMPRISING A TEMPERATURE-CONTROL CONTAINER

(71) Applicant: AUDI AG, Ingolstadt (DE)

(72) Inventors: Christian Rebinger, Munich (DE); Dirk Schroeder, Manching (DE)

(73) Assignee: AUDI AG, Ingolstadt (DE)

( * ) Notice: Subject to any disclaimer, the term of this patent is extended or adjusted under 35 U.S.C. 154(b) by 220 days.

(21) Appl. No.: 18/245,220

(22) PCT Filed: Nov. 22, 2021

(86) PCT No.: PCT/EP2021/082407
§ 371 (c)(1),
(2) Date: Mar. 14, 2023

(87) PCT Pub. No.: WO2022/117376
PCT Pub. Date: Jun. 9, 2022

(65) Prior Publication Data

US 2025/0074160 A1 Mar. 6, 2025

(30) Foreign Application Priority Data

Dec. 2, 2020 (DE) ......................... 102020131978.9

(51) Int. Cl.
*B60H 1/32* (2006.01)
*B60H 1/00* (2006.01)

(52) U.S. Cl.
CPC ....... *B60H 1/3232* (2013.01); *B60H 1/00392* (2013.01); *B60H 1/32281* (2019.05)

(58) Field of Classification Search
CPC .............. B60H 1/00592; B60H 1/3232; B60H 1/00392; B60H 1/32281; B60H 1/00271;
(Continued)

(56) References Cited

U.S. PATENT DOCUMENTS

2009/0218849 A1* 9/2009 Rupar ....................... B60P 3/20 296/182.1
2012/0031140 A1* 2/2012 Zhang ..................... F25D 16/00 62/498
2017/0021698 A1* 1/2017 Hatakeyama .......... B60H 1/143

FOREIGN PATENT DOCUMENTS

CN 102371868 A 3/2012
CN 106103154 A 11/2016
(Continued)

OTHER PUBLICATIONS

DE-102018202142-A1 Translation (Year: 2019).*
(Continued)

*Primary Examiner* — David J Teitelbaum
(74) *Attorney, Agent, or Firm* — Maier & Maier, PLLC

(57) ABSTRACT

A temperature-control container for a motor vehicle having a first heat exchanger for temperature control of the cooling container, a temperature-control container coolant circuit which is connected to the first heat exchanger and which has a coolant com-pressor and an expansion valve assigned to the first heat exchanger, and having a heat exchanger arrangement which has at least one heat exchanger which is connected to a coolant circuit of the motor vehicle. The coolant circuit is connected to at least one electrical drive or storage component for its cooling, and the coolant circuit has a chiller, which is connected to a vehicle coolant circuit, and/or has a low-temperature cooler cooled via ambient air. Furthermore, a cooling container coolant circuit and a motor vehicle having a cooling container are described.

18 Claims, 3 Drawing Sheets

(58) Field of Classification Search
CPC . B60H 2001/00242; F25B 2313/02732; F25B 13/00; F25B 7/00; B60P 3/20
See application file for complete search history.

(56) References Cited

FOREIGN PATENT DOCUMENTS

| | | | | |
|---|---|---|---|---|
| CN | 107074062 A | | 8/2017 | |
| DE | 3544491 C1 | | 6/1987 | |
| DE | 19811185 C1 | | 7/1999 | |
| DE | 10065112 A1 | | 7/2002 | |
| DE | 10203293 A1 | | 7/2003 | |
| DE | 102008005126 B3 | | 7/2009 | |
| DE | 202010000855 U1 | | 7/2010 | |
| DE | 102011015151 A1 | | 5/2012 | |
| DE | 102016219103 A1 | | 4/2018 | |
| DE | 102018101518 A1 | | 7/2019 | |
| DE | 102018202142 A1 | * | 8/2019 | |
| DE | 102019210084 A1 | | 1/2021 | |
| DE | 102020115810 A1 | | 12/2021 | |
| EP | 3492844 A1 | * | 6/2019 | ............. F25B 13/00 |
| EP | 3492844 A4 | | 6/2019 | |
| EP | 3738804 A1 | | 11/2020 | |
| JP | S60121138 A | | 6/1985 | |

OTHER PUBLICATIONS

Examination Report issued on Aug. 3, 2021, in corresponding German Application No. 102020131978.9, 16 pages.

International Search Report and Written Opinion issued on Feb. 23, 2022, in corresponding International Application No. PCT/EP2021/082407, 16 pages.

International Preliminary Report on Patentability issued on May 30, 2023, in corresponding International Application No. PCT/EP2021/082407, 17 pages.

Office Action issued on Jan. 1, 2026, in corresponding Chinese Application No. 202180067662.9, 22 pages.

* cited by examiner

TEMPERATURE-CONTROL CONTAINER AND TEMPERATURE-CONTROL COOLANT CIRCUIT FOR AN ELECTRICALLY DRIVEN MOTOR VEHICLE, AND MOTOR VEHICLE COMPRISING A TEMPERATURE-CONTROL CONTAINER

FIELD

The invention relates to a temperature-control container for a motor vehicle, in particular for an at least partially electrically driven motor vehicle, having a first heat exchanger for temperature control of the temperature-control container, and having a temperature-control container coolant circuit which is connected to the first heat exchanger and which has a coolant compressor and an expansion valve assigned to the first heat exchanger.

BACKGROUND

A cooling container is known from subsequently published DE 10 2020 115 810.6.

A deep-freeze storage space for a motor vehicle is known from DE 10 2018 202 142 A1.

A cooling box device for a motor vehicle is known from subsequently published DE 10 2019 210 084.8, which has an air supply duct used to aspirate exhaust air from the vehicle interior or from air from the vehicle surroundings, so that heat extracted from the goods to be cooled can be dissipated by means of the aspirated air.

SUMMARY

The object on which the invention is based is considered that of also providing a keeping warm function or warming/heating function for a temperature-control container in a motor vehicle in addition to a cooling function.

This object is achieved by a temperature-control container, by a temperature-control container coolant circuit, and by a motor vehicle.

A temperature-control container for a motor vehicle, in particular for an at least partially electrically driven motor vehicle, is therefore proposed, having a first heat exchanger for temperature control of the temperature-control container, a temperature-control container coolant circuit which is connected to the first heat exchanger and which has a coolant compressor and an expansion valve assigned to the first heat exchanger, a further heat exchanger arrangement which has at least one second heat exchanger which is connected to a coolant circuit of the motor vehicle, wherein the coolant circuit is connected to at least one electrical drive component or storage component, in particular a battery of the motor vehicle, for its cooling, and wherein the coolant circuit has a chiller, which is connected to a vehicle coolant circuit, and/or has a low-temperature cooler cooled via ambient air. It is provided that the temperature-control container coolant circuit is configured to conduct coolants in different flow directions through the first heat exchanger.

In other words, the flow through the first heat exchanger can be bidirectional. Correspondingly, the first heat exchanger can be used as an evaporator for cooling or as a condenser or gas cooler for heating the temperature-control container or the air located in the temperature-control container.

Analogously to the first heat exchanger, the further heat exchanger arrangement, in particular the at least one second heat exchanger, can also have flow through it bidirectionally. Correspondingly, the second heat exchanger can be used as a condenser or gas cooler for transferring the heat bound in the coolant from the cooling process or as an evaporator for evaporating the coolant and for generating heating power for the temperature-control container. The existing coolant circuit can thus be used in a simple manner to also provide a heating function in addition to a cooling function.

In the case of the temperature-control container, the coolant circuit can have a reversing line section which branches off downstream of the coolant compressor and upstream of the second heat exchanger. The flow direction of the coolant in the temperature-control container coolant circuit can be changed by the reversing line section downstream of the coolant compressor, in particular in order to be able to provide the heating function by means of the first heat exchanger.

The reversing line section can open out or branch off upstream of the coolant compressor and between the first heat exchanger and the coolant compressor in such a way that coolant conveyed under high pressure by the coolant compressor flows through the first heat exchanger. In this way, heated and high-pressure coolant can be conveyed into the first heat exchanger, so that when the coolant condenses or cools down in the first heat exchanger, heat can be emitted to the temperature-control container or the air located therein.

In the case of the temperature-control container, the coolant circuit can have at least one valve device, in particular at least one 3/2-way valve, which is configured to enable or prevent the coolant flow through the reversing line section. As a result, the cooling function or the heating function of the temperature-control container can be set as desired.

In such a temperature-control container, the temperature of the coolant, for example water or a water-glycol mixture, in the coolant circuit of the electrical component is in most cases at the ambient temperature level or below. Accordingly, in the first heat exchanger of the temperature-control container coolant circuit, the compressed coolant can be reliably cooled (condensed) to a temperature or a pressure level such that the desired temperature level for the cooling function, in particular a refrigerator temperature level of approximately 2° C. to 8° C., can be set during the later evaporation.

If the flow direction of coolant in the temperature-control container coolant circuit is set accordingly, the heat that is bound or circulating in the coolant circuit (waste heat from the at least one electrical vehicle component together with the heat transferred from the compressor to the coolant from the drive power to be provided) can be used for the heating function.

If the system has further potential with respect to reducing the evaporation temperature level, the functionality of the cooling container can be expanded to include a freezing container with respect to the operating range. By lowering the evaporation pressure level of the coolant in the first heat exchanger, evaporation temperatures can be achieved that make it possible to set temperatures below freezing in the temperature-control container.

The icing inside the container, which is also to be considered in such a case, is not considered in detail within the scope of this application.

In the case of the temperature-control container, the further heat exchanger arrangement can have a condenser or gas cooler, which directly subjected to air, in particular (partial) circulating air and/or fresh air, as a second heat exchanger, which is arranged in the temperature-control container coolant circuit, and a third heat exchanger connected to the coolant circuit.

Due to the arrangement of at least two heat exchangers, which are thermally active for the cooling container coolant circuit, it is possible to efficiently cool or heat the cooling container.

In this case, the third heat exchanger can be subjected to air, in particular circulating air and/or fresh air, and can be arranged upstream of the second heat exchanger, which is subjected to air, in relation to the air flow direction.

In an alternative, the third heat exchanger can be an indirect gas cooler or an indirect condenser, which is arranged in the temperature-control container coolant circuit and is arranged downstream or upstream of the second heat exchanger, to which air is applied, in the flow direction of the temperature-control container coolant circuit.

The arrangement of the two (second and/or third) heat exchangers of the temperature-control container coolant circuit working as a condenser or gas cooler is to be selected, in particular in the context of multi-stage cooling, in such a way that the heat exchanger that has the lower cooling temperature level in the majority of operating cases is preferably downstream of the heat exchanger having the typically higher temperature level.

By way of the two mentioned alternatives of the combination of second and third heat exchanger in the heat exchanger arrangement of the temperature-control container, depending on the temperature level at the temperature-control container, a respective heat sink, i.e., second and/or third heat exchanger, can be actively switched on/off deliberately, in particular both can also be switched on together.

A bypass arrangement can be provided in the coolant circuit, which is configured to conduct coolant past the further heat exchanger arrangement. This can ensure that coolant does not flow through the heat exchanger connected to the coolant circuit, in particular the third heat exchanger, and it is therefore not available as a heat sink or alternatively as a heat source.

Such a bypass arrangement can, for example, have a bypass branch that can be shut off by means of a corresponding shut-off element in the flow direction of coolant downstream of the electrical component (battery) to be cooled and is arranged fluidically in parallel to the (third) heat exchanger. Furthermore, a further shut-off element can be provided in the coolant circuit in order to block or release coolant from flowing through the relevant (third) heat exchanger. In a further step, said shut-off devices can be designed as combination valves, for example as a 3-2-way valve or also as a mixing valve.

A temperature-control container coolant circuit for a temperature-control container described above is also proposed, wherein the temperature-control container coolant circuit comprises: a first heat exchanger for temperature control of the temperature-control container, a coolant compressor and an expansion valve assigned to the first heat exchanger, and a further heat exchanger arrangement which has at least one second heat exchanger which is connected to a coolant circuit of the motor vehicle, wherein the coolant circuit is connected to at least one electrical drive component or storage component, in particular a battery of the motor vehicle, for its cooling, and wherein the coolant circuit has a chiller, which is connected to a vehicle coolant circuit, or a low-temperature cooler cooled via ambient air. It is provided that the temperature-control container coolant circuit is configured to conduct coolants in different flow directions through the first heat exchanger.

An electrically driven motor vehicle can have at least one temperature-control container as described above, wherein the motor vehicle has a high-voltage storage device that can be cooled by means of a coolant circuit, wherein the temperature-control container with its temperature-control container coolant circuit is preferably arranged in a rear area of the motor vehicle, in particular is at least partially arranged in a rear baggage compartment.

In the case of the electrically driven motor vehicle, the temperature-control container can have a closable opening which faces toward an interior of the motor vehicle in such a way that goods to be temperature controlled can be filled into the temperature-control container from the interior or can be removed from it.

Depending on the design of the vehicle having a temperature-control container, housing such a temperature-control container is also conceivable in other vehicle positions. In particular, housing positions of the temperature-control container can also be selected depending on whether goods to be temperature controlled can be supplied or removed while driving. The temperature-control container described here can also be referred to as a thermobox.

BRIEF DESCRIPTION OF THE FIGURES

Further advantages and details of the invention result from the following description of embodiments with reference to the figures. In the figures.

DETAILED DESCRIPTION

Figure 1:
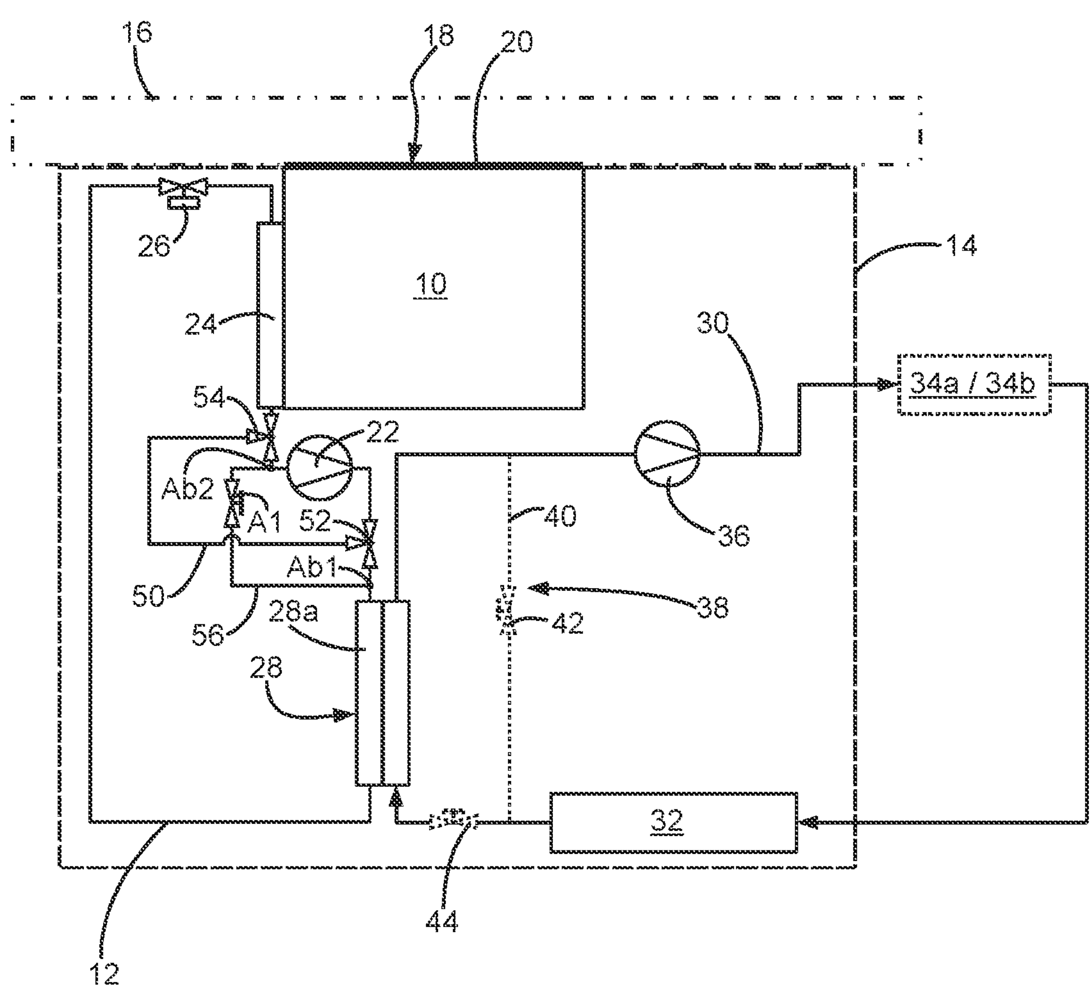
FIG. 1 shows a temperature-control container coolant circuit, which is thermally coupled to a coolant circuit for an electrical component of a motor vehicle, as a first embodiment of the invention.
Figure 2:
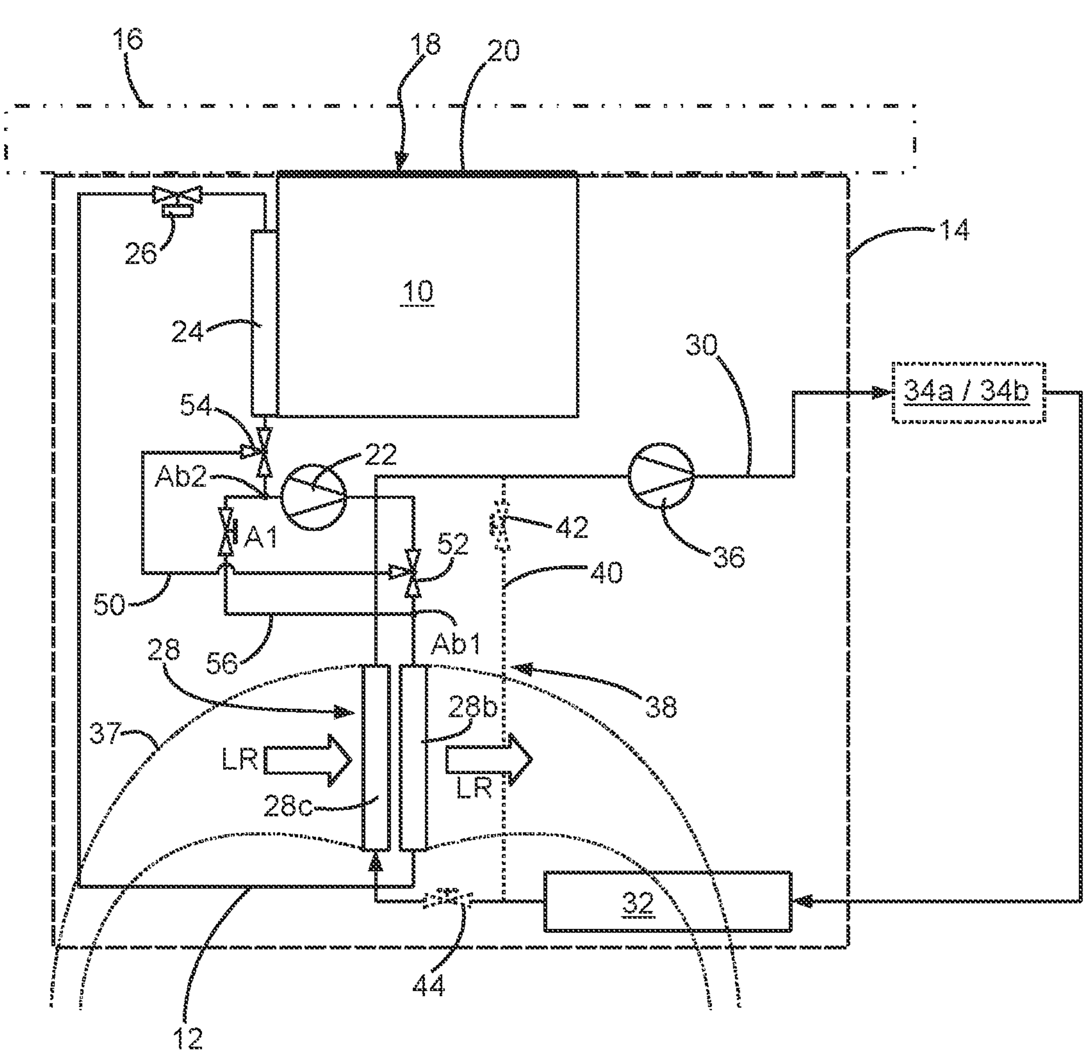
FIG. 2 shows a temperature-control container coolant circuit, which is thermally coupled to a coolant circuit for an electrical component of a motor vehicle, as a second embodiment of the invention.
Figure 3:
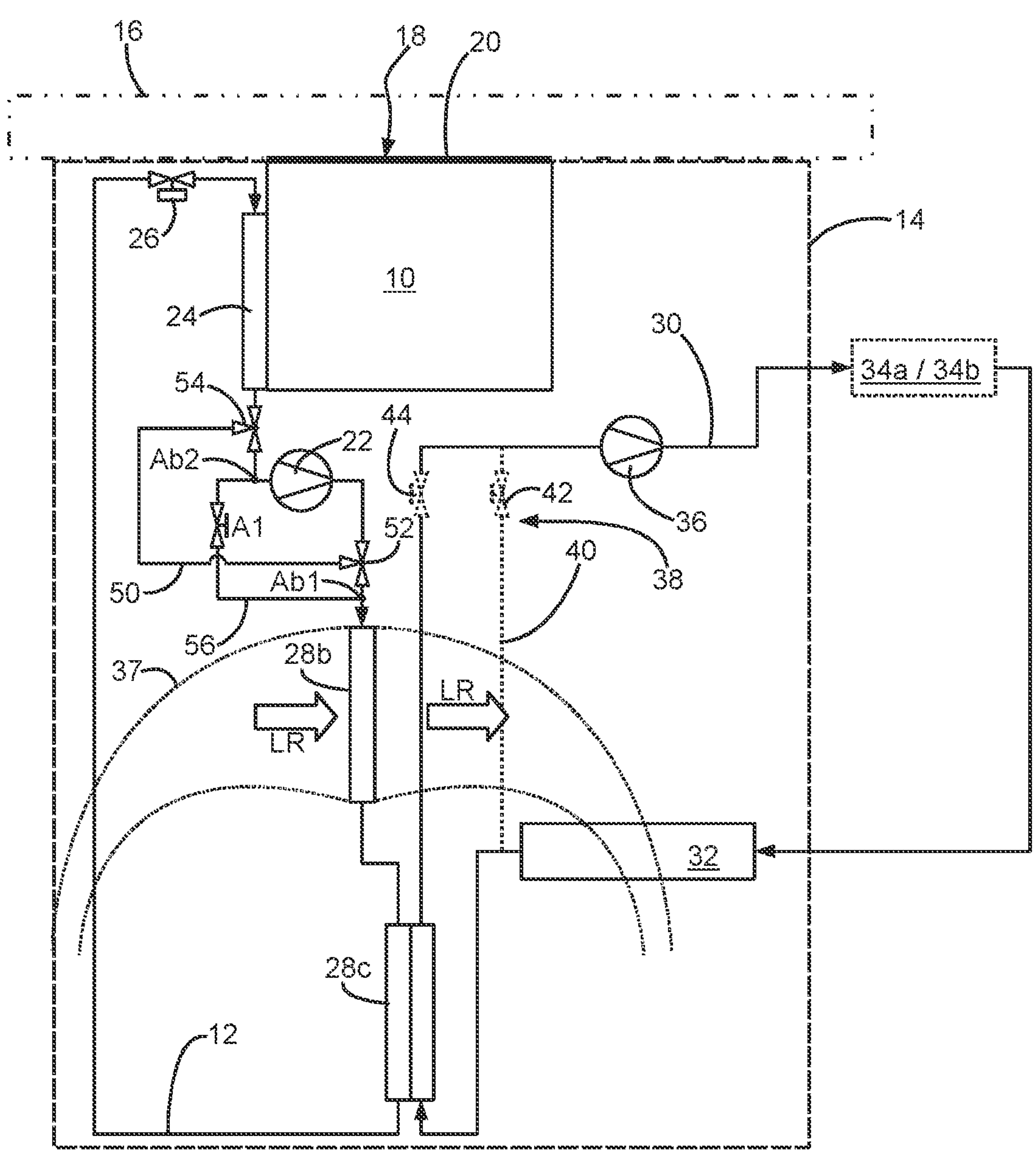
FIG. 3 shows a temperature-control container coolant circuit, which is thermally coupled to a coolant circuit for an electrical component of a motor vehicle, as a third embodiment of the invention.

FIGS. 1 to 3 each show a temperature-control container 10 with a temperature-control container coolant circuit 12 assigned to the temperature-control container 10. The temperature-control container 10 can be arranged, for example, in the area of a baggage compartment 14 of a motor vehicle. The temperature-control container 10 can also have an opening 18 that is closable to form a seat device 16 (for example, a rear bench seat or individual seats or seat shells arranged adjacent to one another). A cover or door element 20 can be provided for this purpose, for example. The opening 18 can therefore face toward the interior of the motor vehicle in such a way that goods to be temperature controlled, for example refrigerated goods or goods to be kept warm, can be filled into or removed from the temperature-control container 10 from the interior.

If the temperature-control container 10 can also be filled and emptied via the baggage compartment 14 of a vehicle, at least one further cover or door element (not shown) can be provided in addition to the cover or door element 20 facing toward the interior. The temperature-control container 10 thus has at least one cover or door element 20.

The temperature-control container coolant circuit 12 comprises a coolant compressor 22, a first heat exchanger 24, and an expansion valve 26 assigned to the first heat exchanger 24. A further heat exchanger arrangement 28 is arranged downstream of the coolant compressor 22 and is connected to a coolant circuit 30 of the motor vehicle. A high-pressure-side or a low-pressure-side coolant collector can be provided in the coolant circuit 12. R744, for example, can be used as the coolant for the temperature-control container coolant circuit 12, in particular also for freezing operation.

The coolant circuit 30 can be connected to at least one electric drive or storage component 32, here for example a battery 32 of the motor vehicle, for its cooling. The coolant circuit 30 can have a chiller 34*a*, which is connected to a vehicle coolant circuit (for air conditioning the motor vehicle), and/or a low-temperature cooler 34*b* cooled by ambient air. The chiller 34*a* and the low-temperature cooler 34*b* are shown here in a greatly simplified manner as a dashed rectangle. Heat generated at the electrical component (battery) 32 can be dissipated via the chiller 34*a* or the low-temperature cooler 34*b*. The coolant circuit 30 furthermore comprises at least one pump 36 which ensures that coolant circulates in the coolant circuit 30.

The coolant circuit 30 is connected to the heat exchanger arrangement 28 downstream of the electrical component 32 and is thus thermally coupled to the cooling container coolant circuit 12.

Precise positioning, in particular the sequence in which the components are arranged in the coolant circuit 30, can be implemented differently depending on the application and has to be specified according to the requirements placed on the system.

The embodiments of the temperature-control container coolant circuit 12 shown in FIGS. 1 to 3 are all designed in such a way that the first heat exchanger 24 can have a bidirectional flow through it. In other words, the first heat exchanger 24 can work as an evaporator for cooling the temperature-control container 10 or as a gas cooler or condenser for heating the temperature-control container 10.

Analogously to the first heat exchanger 24, the further heat exchanger arrangement 28, like the second or further heat exchangers 28*a*, 28*b*, 28*c*, can have a bidirectional flow through it and works, depending on the operating mode of the cooling container coolant circuit 12, as a condenser or gas cooler or as an evaporator.

In order to be able to adapt or adjust the flow direction of coolant through the first heat exchanger 24 or the temperature-control container coolant circuit 12, a reversing line section 50 is connected to the temperature-control container coolant circuit 12 or is provided or arranged therein. The reversing line section 50 branches off downstream of the coolant compressor 22 and upstream of the second heat exchanger 28*a* or the further heat exchanger arrangement 28. The reversing line section 50 opens out upstream of the coolant compressor 22 and between the first heat exchanger 24 and the coolant compressor 22 in such a way that coolant conveyed under high pressure by the coolant compressor 22 can flow through the first heat exchanger 24.

The temperature-control container coolant circuit 12 has at least one valve device 52, 54, in particular at least one 3/2-way valve, which is configured to enable or prevent the coolant flow through the reversing line section 50. In the example shown, a first valve device 52 and a second valve device 54 are provided, which are each arranged at the branches of the reversing section 50 in the temperature-control container coolant circuit 12.

The temperature-control container coolant circuit 12 also has a return line section 56. The return line section 56 extends between a branch Ab1 downstream of the coolant compressor 22 and a branch Ab2 upstream of the coolant compressor 22. The branch Ab1 is arranged between the first valve device 52 and the second heat exchanger 28*a*. The branch Ab2 is arranged between the second valve device 54 and the coolant compressor 22. A shut-off valve A1 can be arranged in the return line section 56.

For the heating function, i.e., heating or keeping the temperature-control container 10 warm, coolant compressed by the coolant compressor 22 flows through the appropriately set first 3/2-way valve 52 in the reversing line section 50. The coolant is then conducted through the appropriately set second 3/2-way valve 54 to the first heat exchanger 24. The first heat exchanger 24 then acts as a gas cooler or condenser. The coolant is then expanded by means of the expansion valve 26 and fed to the further heat exchanger arrangement 28 or the second heat exchanger 28*a* for heat absorption and evaporation there. The coolant then flows back to the coolant compressor 22 via the branch Ab1, the return line section 56, and the branch Ab2. The shut-off valve A1 in the return line section 56 is open.

For the cooling function, the coolant compressed by the coolant compressor 22 flows via the appropriately set first 3/2-way valve 52 to the further heat exchanger arrangement 28 or the second heat exchanger 28*a*. The second heat exchanger 28*a* acts as a gas cooler or condenser. The coolant is then expanded in the first heat exchanger 24 by means of the expansion valve 26. The first heat exchanger 24 is then used as an evaporator. The coolant is fed back to the coolant compressor 22 via the appropriately set second 3/2-way valve 54. In the cooling mode, coolant does not actively flow through the reversing line section 50 and the return line section 56 due to the setting of the 3/2-way valves 52, 54 or the closed shut-off valve A1.

In other words, depending on the settings of the valve devices 52, 54, A1, the temperature-control container coolant circuit 12 can be set in cooling mode or in heating mode in order to either cool or heat the container 10.

The embodiments shown in FIGS. 1 to 3 differ in the way in which the further heat exchanger arrangement 28 is constructed or implemented or its individual components 28*a*, 28*b*, and 28*c* are arranged or can be arranged and placed in relation to one another.

In FIG. 1, the heat exchanger arrangement 28 is designed as an indirect gas cooler or indirect condenser 28*a*. In the temperature-control container coolant circuit 12, in the cooling mode, the coolant that is compressed by the coolant compressor 22 and is therefore hot is cooled to a high-pressure level at the indirect gas cooler or condenser 28*a*, in that heat is emitted to the coolant (for example water or a water-glycol mixture) in the coolant circuit 30. In the heating mode, the coolant flowing in reverse through the indirect gas cooler or condenser 28*a* is evaporated, wherein the heat exchanger arrangement 28 operates as an evaporator at the low-pressure level.

The coolant or cooling water circulates in the coolant circuit 30, which is designed as a low-temperature circuit for cooling at least one high-voltage component, the battery 32 here by way of example. The coolant circuit can be designed so it can be cooled actively and/or passively. For example, it is possible to allow the coolant to be cooled via ambient air at the low-temperature cooler 34*b*. Alternatively or also additionally (cumulatively), a chiller 34*a* can also be integrated into the coolant circuit 30. The temperature level of the coolant in the coolant circuit 30 is usually at the ambient temperature level or below. As a rule, there is always a circulation of coolant, in particular because of the need to flush the battery 32 for its thermal homogenization.

Since the battery 32 is usually arranged in the area of the passenger compartment or also below or in the area of the baggage compartment 14, no complicated coolant-side interconnection in the coolant circuit 30 is required to enable the thermal coupling with the heat exchanger arrangement 28 and thus the temperature-control container coolant circuit 12.

FIG. 2 shows a further embodiment, in which the heat exchanger arrangement 28 has a condenser 28*b* subjected to air, in particular (partial) circulating air and/or fresh air, as a second heat exchanger, which is arranged in the cooling container coolant circuit 12. Furthermore, the heat exchanger arrangement 28 comprises a third heat exchanger 28*c* connected to the coolant circuit 30. In this example, the third heat exchanger 28*c* is subjected to air, in particular (partial) circulating air and/or fresh air. In relation to the air flow direction LR, the second heat exchanger 28*c* is arranged upstream of the first heat exchanger 28*b* to which air is applied. A reverse through-flow on the coolant side and thus an interchanged arrangement of the two heat exchangers 28*b* and 28*c* would also be conceivable. However, in the case of active battery cooling, the coolant usually has a lower temperature than the air flow and this option is therefore less advantageous, but is not ruled out.

Alternatively, it is also conceivable to dispense with the third heat exchanger 28*c*, to which air is applied, which is in turn integrated into the coolant circuit 30, and to condition the temperature-control container-coolant circuit 12 exclusively via the heat exchanger arrangement 28 and the second heat exchanger 28*b* in the form of heat absorption from the coolant or heat emission to the coolant, without it being connected to a coolant circuit 30.

FIG. 3 shows a further embodiment, in which the heat exchanger arrangement 28 has a condenser 28*b* subjected to air, in particular (partial) circulating air and/or fresh air, as a second heat exchanger, which is arranged in the temperature-control container coolant circuit 12. In this example, the third heat exchanger 28*c* is an indirect condenser, which is arranged in the temperature-control container coolant circuit 12 and is arranged downstream of the first heat exchanger 28*b*, to which air is applied, in the flow direction of the temperature-control container coolant (with respect to the cooling mode). Alternatively, the third heat exchanger 28*c* designed as an indirect condenser can also be arranged upstream of the second heat exchanger 28*b* with respect to the coolant flow direction in the cooling mode. A reverse through-flow on the coolant side and thus an interchanged arrangement of the two heat exchangers 28*b* and 28*c* would also be conceivable. However, in the case of active battery cooling, the coolant is usually temperature controlled to a lower temperature than the air flow and this option is therefore less advantageous, but is not ruled out.

In FIGS. 2 and 3, an air supply duct 37 is indicated by dash-dot lines, which can supply air to the further heat exchanger arrangement 28, in particular to the specific heat exchangers 28*b* (FIGS. 2 and 3), 28*c* (FIG. 2) to which air is applied. The course of the air supply duct 37 is shown solely schematically. For example, fresh air from outside the vehicle and/or circulating air from the interior of the vehicle can be supplied to this air supply duct 37. Of course, the air flow in the air supply duct 37 can also be a mixture of fresh air and circulating air, i.e., a so-called partial circulating air flow.

The combination of different heat exchangers 28*b*, 28*c* according to the embodiments of FIGS. 2 and 3 makes it possible to use the respective heat sink, i.e., the second and/or the third heat exchanger 28*b*, 28*c*, depending on the temperature level in the environment of the cooling container. In other words, the second and/or the third heat exchanger can be switched to be active or passive, in particular depending on temperatures detected in the temperature-control container coolant circuit 12, in the coolant circuit 30, in the environment, in the interior.

So that the heat exchanger 28*a* (FIG. 1) or 28*c* (FIGS. 2 and 3) connected to the coolant circuit 30 can be deactivated as a heat sink for the coolant circuit 12, a bypass arrangement 38 can be provided in the coolant circuit 30, which is configured to conduct coolant past the heat exchanger assembly 28. In the examples of FIGS. 1 to 3, the bypass arrangement 38 is shown in dashed lines. It can have a bypass section 40, for example, which can conduct coolant fluidically in parallel past the heat exchanger 28*a* or 28*c*. Furthermore, valve elements 42, 44, which can be shut off and which can also be implemented as a combination valve in the form of a 3-2-way valve or mixing or rotary valve, can be provided, which are optionally open or closed to control the coolant flow in the coolant circuit 30. The heat exchanger 28*b* subjected to air can be switched to be passive by deactivating an air duct fan (not shown), so that the supply air flow is shut off.

The desired settings can be made on the temperature-control container 20, such as the definition of cooling or heating requirements and the respective temperature and/or beginning or end and/or duration of the process, etc., via an adjustment device (not shown) on the temperature-control container 20 or in an alternative position, for example a multimedia interface. The adjustment device is coupled to a control unit, which in turn initiates, regulates, and monitors the process control.

The invention claimed is:

1. A temperature-control container for a motor vehicle for an at least partially electrically driven motor vehicle, comprising:

a first heat exchanger for temperature control of the temperature-control container, a temperature-control container coolant circuit, which is connected to the first heat exchanger and has a coolant compressor and at least one expansion valve assigned to the first heat exchanger, a further heat exchanger arrangement which has at least one second heat exchanger which is connected to a coolant circuit of the motor vehicle, wherein the coolant circuit is connected to at least one electrical drive component or storage component, the at least one electrical drive component or storage component comprising a battery of the motor vehicle, for cooling the at least one electrical drive component or the storage component, and wherein the coolant circuit has a chiller, which is connected to a vehicle coolant circuit, or/and has a low-temperature cooler cooled via ambient air, wherein the temperature-control container coolant circuit is configured to conduct coolant in different flow directions through the first heat exchanger in a first configuration and in a second configuration, wherein in the first configuration the first heat exchanger is configured to operate as a evaporator configured to extract heat from the temperature-control container and wherein a flow direction is a first direction, and wherein in the second configuration the first heat exchanger is configured to act as a condenser or gas cooler configured to add heat to the temperature-control container and wherein the flow direction is a second direction opposite the first direction, wherein the temperature-control container is provided in an area of a baggage compartment of the motor vehicle and is provided adjacent to a passenger compartment of the motor vehicle, wherein the temperature-control container has a cover or door configured to open into the passenger compartment, and wherein the temperature-control container has a further container or further door that is configured to open into the baggage compartment, each of the cover or door and the further cover or further door permitting goods to be temperature controlled to be filled into the temperature-control container from an interior of the motor vehicle or removed from the temperature-control container.

2. The temperature-control container as claimed in claim 1, wherein the temperature-control container coolant circuit has a reversing line section which branches off downstream of the coolant compressor and upstream of the second heat exchanger.

3. The temperature-control container as claimed in claim 2, wherein the reversing line section opens out upstream of the coolant compressor and between the first heat exchanger and the coolant compressor in such a way that a coolant conveyed by the coolant compressor under high pressure flows through the first heat exchanger.

4. The temperature-control container as claimed in claim 3, wherein the temperature-control container coolant circuit has at least one valve device comprising at least one 3/2-way valve, which is configured to enable or prevent the coolant flow through the reversing line section.

5. The temperature-control container as claimed in claim 3, wherein the further heat exchanger arrangement has a condenser which is supplied with air, said air comprising circulating air and/or fresh air, as a second heat exchanger which is arranged in the temperature-control container coolant circuit, and a third heat exchanger connected to the coolant circuit.

6. The temperature-control container as claimed in claim 2, wherein the temperature-control container coolant circuit has at least one valve device comprising at least one 3/2-way valve, which is configured to enable or prevent the coolant flow through the reversing line section.

7. The temperature-control container as claimed in claim 6, wherein the further heat exchanger arrangement has a condenser which is supplied with air, said air comprising circulating air and/or fresh air, as a second heat exchanger which is arranged in the temperature-control container coolant circuit, and a third heat exchanger connected to the coolant circuit.

8. The temperature-control container as claimed in claim 3, wherein a bypass arrangement is provided in the coolant circuit, which is designed to conduct coolant past the further heat exchanger arrangement.

9. The temperature-control container as claimed in claim 6, wherein a bypass arrangement is provided in the coolant circuit, which is designed to conduct coolant past the further heat exchanger arrangement.

10. The temperature-control container as claimed in claim 2, wherein the further heat exchanger arrangement has a condenser which is supplied with air, said air comprising circulating air and/or fresh air, as a second heat exchanger which is arranged in the temperature-control container coolant circuit, and a third heat exchanger connected to the coolant circuit.

11. The temperature-control container as claimed in claim 2, wherein a bypass arrangement is provided in the coolant circuit, which is designed to conduct coolant past the further heat exchanger arrangement.

12. The temperature-control container as claimed in claim 1, wherein the further heat exchanger arrangement has a condenser which is supplied with air, said air comprising circulating air and/or fresh air, as a second heat exchanger which is arranged in the temperature-control container coolant circuit, and a third heat exchanger connected to the coolant circuit.

13. The temperature-control container as claimed in claim 12, wherein the third heat exchanger is supplied with air, said air comprising circulating air and/or fresh air, and is arranged upstream of the second heat exchanger, to which air is supplied, with respect to the air flow direction.

14. The temperature-control container as claimed in claim 13, wherein a bypass arrangement is provided in the coolant circuit, which is designed to conduct coolant past the further heat exchanger arrangement.

15. The temperature-control container as claimed in claim 12, wherein the third heat exchanger is an indirect gas cooler or an indirect condenser, which is arranged in the temperature-control container coolant circuit and is arranged downstream or upstream of the second heating exchanger, to which air is supplied, in the flow direction of the temperature-control container coolant circuit.

16. The temperature-control container as claimed in claim 12, wherein a bypass arrangement is provided in the coolant circuit, which is designed to conduct coolant past the further heat exchanger arrangement.

17. The temperature-control container as claimed in claim 1, wherein a bypass arrangement is provided in the coolant circuit, which is designed to conduct coolant past the further heat exchanger arrangement.

18. An electrically driven motor vehicle having at least one temperature-control container as claimed in claim 1, wherein the motor vehicle has a high-voltage storage device configured to be cooled by the coolant circuit, wherein the temperature-control container, with the temperature-control container coolant circuit, is arranged in a rear area of the motor vehicle and at least partially arranged in a rear baggage compartment.

* * * * *